Dec. 22, 1925.
R. C. STEVENS
1,566,627
VALVE GEAR FOR STEAM ENGINES
Filed March 30, 1922
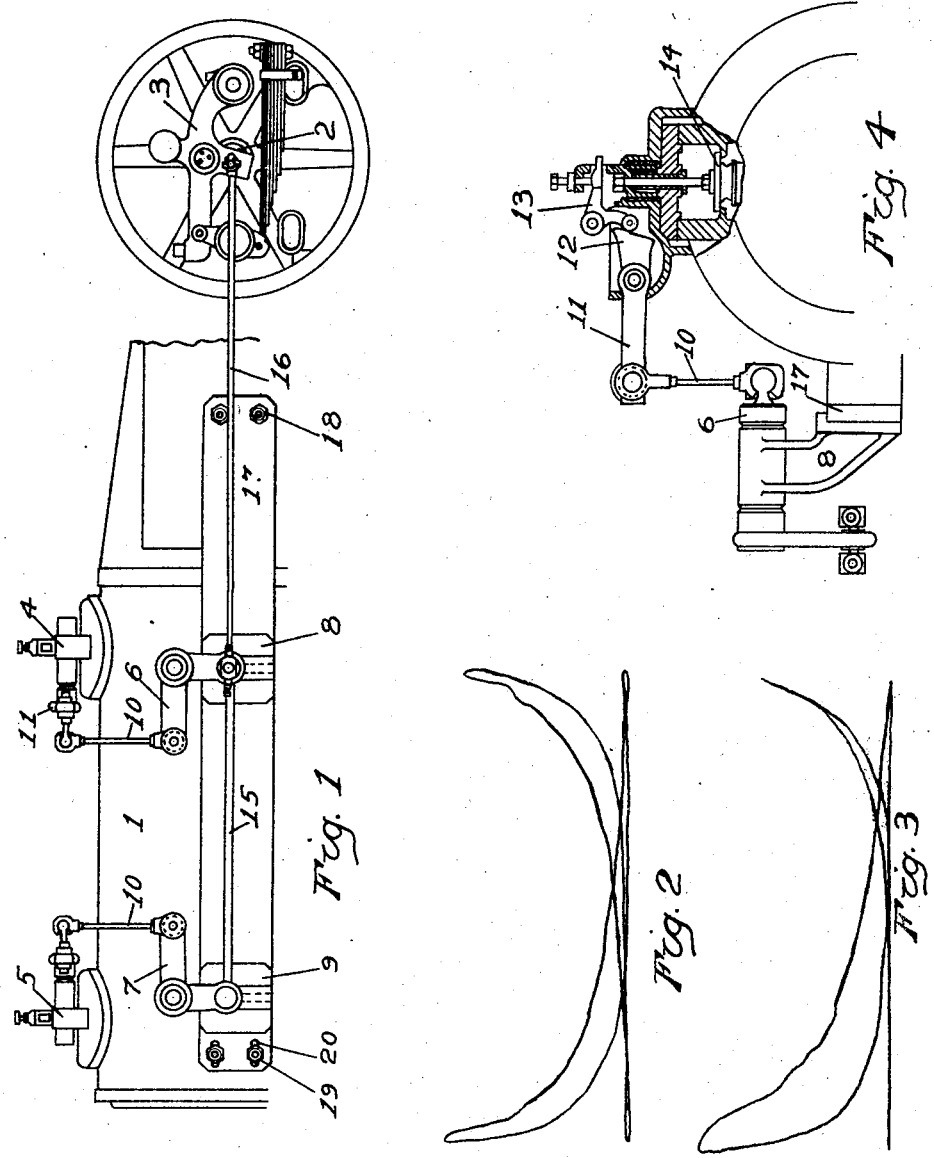
Robert C. Stevens
INVENTOR.
BY *[signature]*
ATTORNEY Patented Dec. 22, 1925.

1,566,627

UNITED STATES PATENT OFFICE.

ROBERT C. STEVENS, OF ERIE, PENNSYLVANIA.

VALVE GEAR FOR STEAM ENGINES.

Application filed March 30, 1922. Serial No. 548,101.

*To all whom it may concern:*

Be it known that I, ROBERT C. STEVENS, a citizen of the United States, residing at Erie, in the county of Erie and State of Pennsylvania, have invented certain new and useful Improvements in Valve Gears for Steam Engines; and I do hereby declare the following to be a full, clear, and exact description of the invention, such as will enable others skilled in the art to which it appertains to make and use the same.

This invention relates to steam engine valve gears and pertains more particularly to valve gears for steam engines having inlet ports controlled by puppet valves.

The objects of my invention are to provide a valve-actuating gear operated from the engine shaft and adapted to actuate the valve without liability of misadjustment or disarrangement of the valve setting due to expansion or contraction of the engine cylinder.

Engines to which my improvement is adapted to be applied may be either of the uniflow or counterflow types.

It has heretofore been customary in practice to locate an inlet puppet valve near each end of the cylinder and to actuate the valve by means of reach rods, or other equivalent devices, the rods being operated from the engine governor on the main shaft.

It has been found, however, that the expansion of the cylinder longitudinally and the expansion of the rods or other mechanisms that connect the two valves are not equal. Consequently the accuracy of adjustment and timing of the two valves is not properly maintained when the engine cylinder undergoes changes of length due to changes of temperature, such as it is subjected to in service.

In previous attempts to overcome this difficulty, lay shafts have usually been employed, the lay shafts driven by gears from the main shaft; or the lay shafts have been actuated from a governor on the main shaft.

While such a lay shaft arrangement overcomes the difficulty experienced from misplacement of the valves caused by expansion of the engine cylinder relative to the valve gear, yet the lay shafts have the disadvantage of being expensive and, if geared to the engine shaft, of being noisy in operation.

It is, therefore, a purpose of my present invention to accomplish the desired result of maintaining proper valve setting regardless of expansion and contraction of the cylinder without using either a lay shaft or gear wheels.

I accomplish this object and certain others which will appear later in the specification, by the devices herein described and claimed and the equivalents thereof.

In the drawings, Fig. 1 is a fragmentary side elevation of an engine cylinder embodying my improvement.

Fig. 2 is a reproduction of an actual indicator diagram taken from a puppet valve engine with proper valve adjustment.

Fig. 3 is an indicator card taken from the same engine when operating at a different temperature but without any change in valve adjustment from that of Fig. 2.

Fig. 4 is a part sectional end elevation of a cylinder equipped with a puppet valve and my improved valve gear.

In the drawings, 1 is the engine cylinder and 2 is the engine shaft, usually fitted with a shaft governor 3, or connected for operation to any other suitable type of governor.

4 and 5 are the bonnets of puppet valves controlling the steam inlet to the cylinder.

6 and 7 are rockers pivotally mounted respectively on brackets 8 and 9 located alongside the cylinder, but not fixed to the cylinder, as will presently be described. The rockers 6 and 7 are connected by links 10 with the respective valves, and as shown in Fig. 4, the preferable form of connection is by means of an oscillating cam arm 11 having a cam 12 adapted to actuate valve lever 13 which in turn operates the puppet valve 14 in the usual manner. The rockers 6 and 7 are connected by a reach rod 15 and are actuated by an eccentric rod 16.

To preserve the proper distance between the pivotal centers of rockers 6 and 7, regardless of expansion and contraction of the cylinder and to thereby preserve the original operative adjustment of the valves, I mount the rocker brackets 8 and 9 on a bar 17.

This bar is not fixed to the cylinder 1 in such manner as to move with the expansion and contraction of the cylinder, but is preferably fixed near one end to the frame of the engine, or to some part which is not subjected to appreciable expansion and contraction, as by means of bolts 18. The opposite end of the bar may be supported from the cylinder by bolts 19 received in slotted holes 20 formed in the bar 17.

By this arrangement, the outboard end of the cylinder may move by expansion or contraction of the cylinder without affecting the distance between the pivotal centers of rockers 6 and 7. The rod 15 and the bar 17 remain unheated or evenly heated, and alike in temperature, consequently they will not expand relatively to each other, whether the engine be under steam or not.

Expansion of the cylinder when under steam will slightly vary the distance between the centerlines of the puppet valves, but the timing and operation of the valves will not be affected thereby.

Links 10 preferably are pivotally connected by means of ball joints at their upper ends to the cam arms 11, and are similarly connected at their lower ends to the rockers 6 and 7 respectively, to permit the requisite expansive movement of the cylinder and the consequent change of distance between the puppet valves without disarranging the operation of those valves, as above described.

By the means herein set forth, I have produced a valve gear adapted to be applied to puppet valve engines that permits free expansion of the cylinder without in any way altering or disarranging the timing, amplitude of opening or other functions of the puppet valves.

Having thus described my invention, what I claim and desire to secure by Letters Patent is:

1. In a steam engine, a cylinder, inlet valves on said cylinder near the ends thereof, an engine shaft, a supporting member fixed at one end to said engine and extending lengthwise said cylinder, the other end of said member slidingly supported with relation to said cylinder, a pair of rockers carried by said member and operatively connected to said engine shaft, and valve-actuating devices including links connecting said rockers and said valves respectively.

2. In a steam engine, a frame, a cylinder, inlet valves on said cylinder near the ends thereof, a governor, a supporting member fixed at one end to said frame and extending lengthwise said cylinder, said cylinder longitudinally expansible independently of said member, a pair of rockers pivotally mounted on said member and operatively connected to said governor, and valve-actuating devices including upright links connecting said rockers and said valves respectively.

3. In a steam engine, a cylinder, inlet valves on said cylinder near the ends thereof, a supporting bar fixed at one end to said engine and extending lengthwise said cylinder, said cylinder longitudinally expansible independently of said bar, a pair of brackets on said bar, rockers pivotally carried by said brackets, valve-actuating devices including upright links connecting said rockers and valves respectively, and means for simultaneously actuating said rockers in synchronism with the operation of said engine.

In testimony whereof, I affix my signature.

ROBERT C. STEVENS.